United States Patent [19]

Yanagida

[11] Patent Number: 4,518,657
[45] Date of Patent: May 21, 1985

[54] RECORDING MEDIUM AND RECORDING-REPRODUCTION SYSTEM PROVIDED WITH THE RECORDING MEDIUM

[75] Inventor: Tuneo Yanagida, Tokyo, Japan

[73] Assignee: Olympus Optical Co., Ltd., Tokyo, Japan

[21] Appl. No.: 308,829

[22] Filed: Oct. 5, 1981

[30] Foreign Application Priority Data

Oct. 17, 1980 [JP] Japan ................................ 55-145117

[51] Int. Cl.³ .......................... G11B 5/72; G11B 5/66
[52] U.S. Cl. ................................... 428/450; 360/114; 360/134; 360/135; 360/136; 427/128; 427/131; 427/132; 428/446; 428/692; 428/693; 428/694; 428/900; 428/621; 428/655; 428/678; 428/928
[58] Field of Search ............... 428/692, 694, 693, 450, 428/678, 928, 655, 621, 446, 900; 427/131, 132, 128; 360/114, 134, 135, 136

[56] References Cited

U.S. PATENT DOCUMENTS

| | | | |
|---|---|---|---|
| 3,229,273 | 1/1966 | Baaba | 360/114 |
| 4,042,341 | 8/1977 | Smeggil | 428/693 |
| 4,210,946 | 7/1980 | Iwasaki | 427/131 |
| 4,277,809 | 7/1981 | Fisher | 427/131 |
| 4,293,621 | 10/1981 | Togami | 428/694 |
| 4,367,257 | 1/1983 | Arai | 428/692 |
| 4,390,600 | 6/1983 | Ohta | 428/694 |

FOREIGN PATENT DOCUMENTS 3018415 11/1980 Fed. Rep. of Germany ...... 360/114

Primary Examiner—Ellis P. Robinson
Attorney, Agent, or Firm—Frishauf, Holtz, Goodman & Woodward

[57] ABSTRACT

A recording medium comprises a first layer prepared from a material of perpendicular anisotropy, a second layer prepared from a compound of noncrystalline rare earth metal—3d transition metal and deposited on said first layer, and a transparent protective layer mounted on said second layer. Data is magnetically recorded on the recording medium and the recorded data is optically read by utilizing the magneto-optics effects.

10 Claims, 4 Drawing Figures

RECORDING MEDIUM AND RECORDING-REPRODUCTION SYSTEM PROVIDED WITH THE RECORDING MEDIUM

BACKGROUND OF THE INVENTION

This invention relates to a recording medium and a recording-reproduction system provided with the recording medium.

With the conventional recording-reproduction apparatus carrying out recording and reproduction by means of a magnetic head, contraction of a track width to increase track density results in a decline in the S/N ratio at the time of reproduction. Therefore, it has been necessary to elevate the relative speed at which the magnetic head slides along the surface of the tape and the tape travels in order to carry out reproduction without a decrease in the S/N ratio.

With a PCM recording apparatus, for instance, recording and reproducing times to a tape of a unit length are made of short. With a recording-reproduction apparatus in which the magnetic head is made to contact the recording medium, the effective life of the recording medium is extremely shortened.

With the longitudinal recording method using the conventional magnetic head, a demagnetized region progressively increases in area as data is recorded with higher density in a magnetic recording region. Particularly with saturated recording such as digital recording, it is extremely difficult to elevate linear recording density due to the rotation of a magnetic vector in the recording medium. Recently, a perpendicular magnetic recording system has been developed. This new recording system elevates the density of linear recording, and has a theoretically excellent property for high density recording in that a demagnetized region in the recording medium more decreases, as recording density increases. However, the new recording system still has the drawback that where it is attempted to increase track density, then the S/N ratio drops due to the contraction of the track width.

SUMMARY OF THE INVENTION

It is accordingly the object of this invention to provide a recording medium having a great magneto-optics effect, and a recording-reproduction method capable of recording and reproducing data with high density without reducing the S/N ratio at the time of reproduction.

To attain the above-mentioned object, this invention provides a recording medium which comprises a first layer prepared from a material of perpendicular magnetic anisotropy which has a high coercive force, high remnant magnetic flux density and small anisotropic dispersion angle, a second layer prepared from a compound of noncrystalline rare earth metal—3d transition metal and mounted on the first layer, and a protective layer prepared from a transparent nonmagnetic material and deposited on the second layer. This invention further provides a recording-reproduction system which comprises a narrow track head for carrying out perpendicular magnetic recording on the recording medium and reproduction means for optically reproducing data recorded in the recording medium by utilizing the magneto-optics Kerr effect.

DETAILED DESCRIPTION OF THE PREFERRED EMBODIMENT

Figure 1:
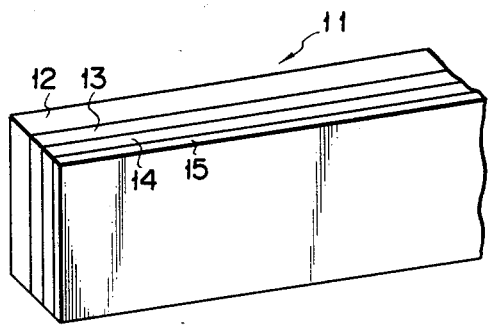
FIG. 1 is an oblique view of a recording medium embodying this invention.

A recording medium 11 of FIG. 1 comprises a first magnetic layer 13 of perpendicular magnetic anisotropy which has a small anisotropy dispersion angle and is mounted on a base layer 12. A second magnetic layer 14 prepared from a compound (also referred to as an "alloy") of noncrystalline rare earth metal—3d transition metal is formed on the magnetic layer 13. A transparent surface-protecting layer 15 prepared from, for example, SiO is coated on the magnetic layer 14. The compound of noncrystalline rare earth metal—3d transition metal constituting the magnetic layer 14 has perpendicular magnetic anisotropy and is particularly adapted for a perpendicular recording system. The noncrystalline material is free from a region of crystallized particles, and assures reproduction with a high S/N ratio, thus indicating an excellent high density recording property. Table 1 below lists compounds of noncrystalline rare earth metal—3d transition metal, showing related factors.

TABLE 1

Figure 2:
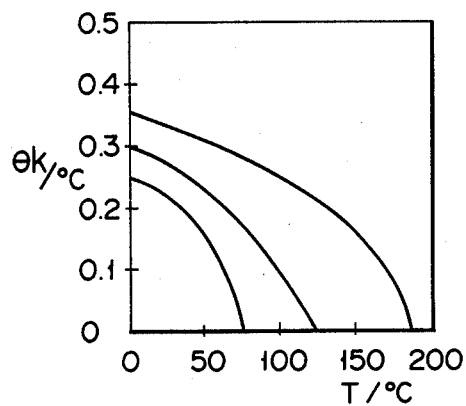
FIG. 2 graphically shows relationship between the magneto-optics Kerr effect $\theta_K$ and temperature.
Figure 3:
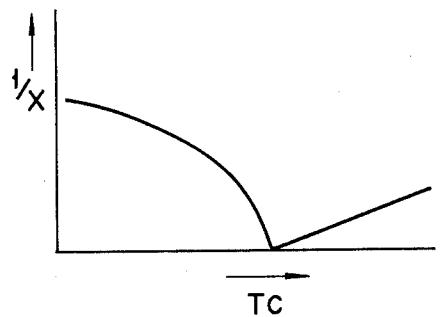
FIG. 3 graphically indicates relationship between the magnetic susceptibility and Curie temperature.

| Compound | $4\pi Ms(G)$ | Hc(Oe) | Curie temperature or compensation temperature | Recording temperature (°C.) | Easy axis |
|---|---|---|---|---|---|
| Gd—Co | 3,500 | 10–100 | Tcomp | 120 | ⊥ |
| Gd—Fe | 0–400 | 10–100 | Tc | 230 | ⊥ |
| Tb—Fe | 0–400 | 1K–7K | Tc | 120 | ⊥ |
| Dy—Fe | 0–400 | 500–2,000 | Tc | 60 | ⊥ |

Where any of the compounds of noncrystalline rare earth metal—3d transition metal listed in Table 1 above is applied, reproduction is generally carried out by utilizing the Farady effect or magneto-optics Kerr effect. However, the Kerr effect is more accepted becuase of the simple arragement of an optical system and a large contrast of reflected light. The magnitude of $\theta_K$ indicating the magneto-optics Kerr effect varies with temperature as indicated by curves given in FIG. 2. As seen from the curves, an increase in the surface temperature of a recording medium results in a decline in the value of $\theta_K$ and consequently a decrease in the S/N ratio. Where, therefore, data is read out of the recording medium, it is necessary to take care to properly control an output of beams. With a recording medium embodying this invention, however, in which reproduction is carried out by a kind of optical transfer reading, it is unnecessary to have much attention to the control of an output of beams. The second magnetic layer 14 formed of a noncrystalline material (amorphous alloy) of GdCo or GdFe, has a coercive force of about 10 to 100 Oe. Therefore, a magnetization pattern on the first magnetic layer 13 is directly transferred on the second magnetic layer 14. Even where, in this case, a large output of beams is read out, and the surface temperature of the first magnetic layer 13 rises, the magnetic susceptibility X varies as indicated by a curve given in FIG. 3. Therefore, the spin direction of the second magnetic layer 14 coincides with the direction in which the magnetic layer 13 is magnetized, thereby preventing $\theta_K$ from decreasing in value. Where the magnetic layer 13 is formed of a noncrystalline compound having a great coercive force Hc such as Tb-Fe or Dy-Fe, then it is possible to carry out reproduction with a large S/N ratio by applying large reading laser power and at a temperature closely approaching the Curie temperature Tc.

Figure 4:
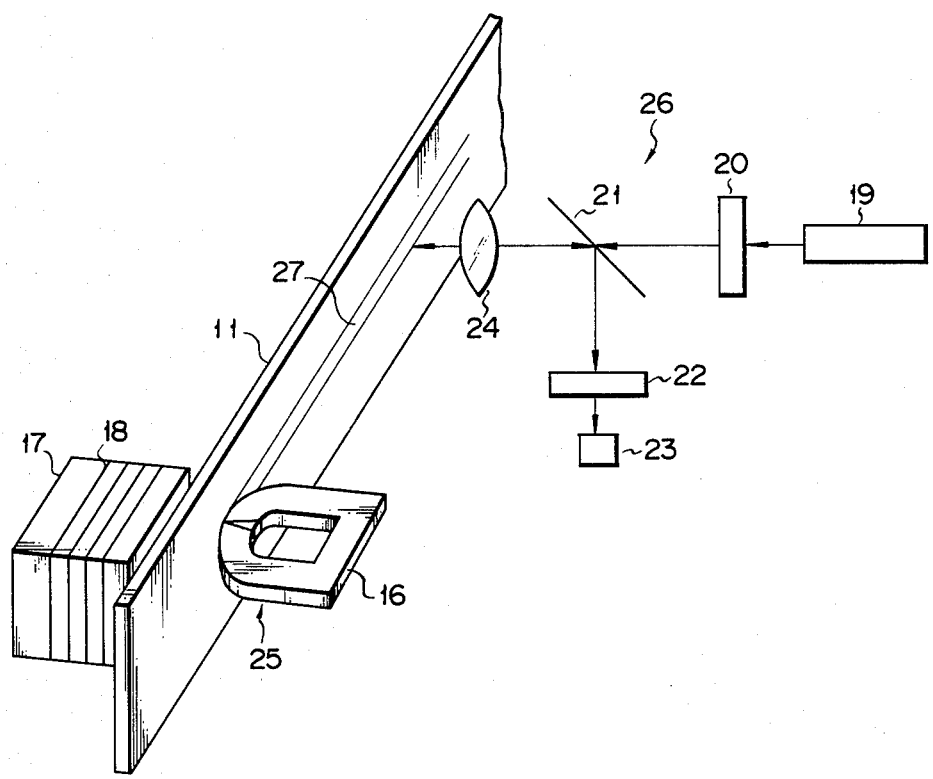
FIG. 4 schematically illustrates a recording-reproduction system using the recording medium of FIG. 1.

Description is now given with reference to FIG. 4 of the magnetic recording-reproduction system provided with the recording medium of FIG. 1. The recording medium 11 travels between a main magnetic pole 16 and an auxiliary magnetic pole 17. A coil 18 is wound about the auxiliary magnetic pole 17 for magnetization. The coil 18 is connected to a recording amplifier. A light source, for example, a laser generator 19 is set to face a half mirror 21 with a polarizer 20 interposed therebetween. A light-receiving element 23 is so arranged as to face the half mirror 21 in a state intersecting a path of laser beams at right angles with an optical system 22 interposed therebetween. The half mirror 21 faces the recording medium 11 with a condenser lens 24 disposed therebetween.

The main magnetic pole 16 and auxiliary magnetic pole 17 jointly constitute a recording head 25. The laser generator 19, polarizer 20, half mirror 21, optical system 22, light-receiving element 23 and condenser lens 24 jointly constitute a reproduction pickup 26. With the recording-reproduction system arranged as described above, data is recorded on a recording medium by means of the recording head 25 magnetically, that is, by perpendicular magnetic recording, and data is optically reproduced by utilizing the magneto-optics effect.

Description is now given of the operation of the above-mentioned recording-reproduction system. At recording, the magnetizing coil 18 of the auxiliary magnetic pole 17 is supplied with magnetizing current corresponding to signals to be recorded (hereinafter simply referred to as "recording signals"). At this time, the cooperation of the fine tip of the main magnetic pole 16 and the auxiliary magnetic pole 17 causes recording signals to be recorded in the recording medium 11 by perpendicular magnetic recording. At the time of reproduction, laser beams are emitted from the laser generator 19. The laser beams are collected on one of the recording tracks 27 of the recording medium 11 through the polarizer 20, half mirror 21 and condenser lens 24. At this time, focusing and tracking are controlled by the known focus servo and tracking servo (which are not shown). Laser beams modulated by the track 27 are brought to the half mirror 21 through the condenser lens 24 to be reflected at right angles by the half mirror 21, and then carried into the light-receiving element 23 through the optical system 22. An output signal from the light-receiving element 23 is demodulated into a recording signal by a signal demodulator (not shown).

As described above, a recording medium embodying this invention is prepared from a material having perpendicular magnetic anisotropy and great magneto-optics effect. Perpendicular magnetic recording and optical reproduction based on the magneto-optics effect are carried out by using a recording medium prepared as described above. Therefore, recording and reproduction can be effected with great line density and track density, that is, with great area density. Further, reproduction is carried out by a sort of optical transfer reading, making it unnecessary to rigidity control the power of reproduction laser beams. Moreover, the recording and reproduction of the recording medium embodying this invention are carried out by fully drawing upon the properties of the compound of noncrystalline rare earth metal—3d transition metal constituting the recording medium. The total thickness of the layer of the compound of noncrystalline rare earth metal—3d transition metal and the surface protection layer is smaller than 2,000 Å. Therefore, such space is little supposed to exert any harmful effect on recording.

What is claimed is:

1. A recording and reproduction system which comprises: a recording head constituted by main and auxiliary magnetic poles so arranged as to clamp a recording medium which is formed of a first layer comprising a first magnetic alloy material having perpendicular magnetic anisotropy, a high coersive force, a high remnant magnetic flux density and a small anisotropy dispersion angle, a second layer comprising a second magnetic amorphous alloy of a rare earth metal—3d transition metal positioned on said first layer, said second layer having a lower coersive force and higher Curie temperature than said first layer, said first and second alloys being different alloys and one of them containing one constituent element not present in said other alloy; and a protective layer prepared from a transparent nonmagnetic material on said second magnetic layer for recording data on the recording medium by a perpendicular magnetic recording method; and reproduction means for reading data out of the recording medium by the magneto-optics effect.

2. The recording and reproduction system according to claim 1, wherein a magnetizing wire is wound about the auxiliary magnetic pole; and said magnetizing wire is supplied with magnetizing current corresponding to signals to be recorded.

3. A recording and reproduction system according to claim 1 or 2, wherein the reproduction means comprises:

a light source for projecting light beams on the recording medium; and a light-receiving element for receiving reflections modulated by data recorded in the recording medium, and demodulating said modulated reflections into signals corresponding to said recorded data.

4. A recording medium comprising a first and a second contiguous magnetic alloy layers:

said first magnetic alloy layer comprising a first magnetic alloy material having perpendicular magnetic anisotropy, a high coersive force, a high remnant magnetic flux density and a small anisotropy dispersion angle;

said second magnetic layer comprising a second magnetic amorphous alloy of a rare earth metal—3d transition metal positioned on said first magnetic layer, said second magnetic layer having a lower coersive force and higher Curie temperature than said first magnetic layer, said first and second alloys being different alloys and one of them containing one constituent element not present in said other alloy; and a protective layer prepared from a transparent nonmagnetic material on said second magnetic layer.

5. The recording medium of claim 4, wherein said first magnetic alloy layer is an amorphous alloy of a rare earth metal 3-d transition metal.

6. The recording medium of claim 4 or 5, wherein said second magnetic layer comprises Gd-Fe.

7. The recording medium according to claim 6, wherein the first magnetic layer comprises Tb-Fe.

8. The recording medium of claim 6, wherein the first magnetic layer comprises Dy-Fe.

9. The recording medium according to claim 4, wherein the first magnetic layer comprises Tb-Fe.

10. The recording medium of claim 8, wherein the first magnetic layer comprises Dy-Fe.

* * * * *